Oct. 31, 1967
G. C. KNUDSON
3,349,855
HYDRAULIC PLOW BOTTOM TRIP DEVICE
Filed May 18, 1965
3 Sheets-Sheet 1
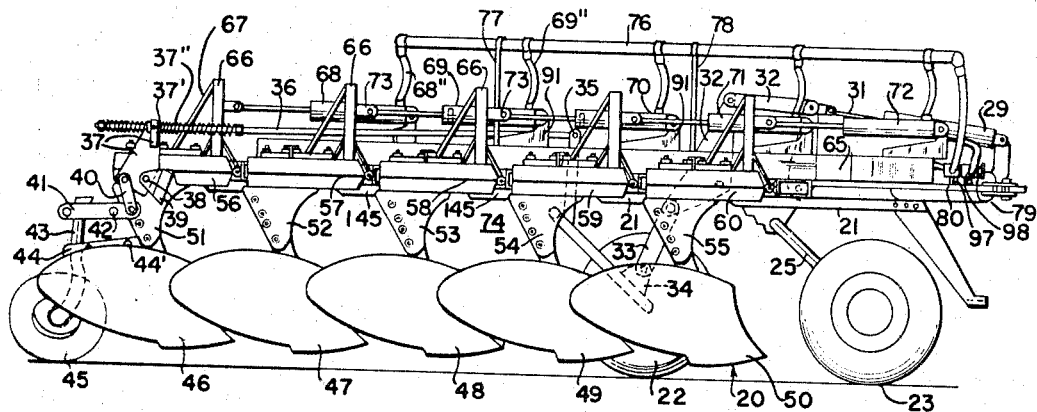
FIG. 1.
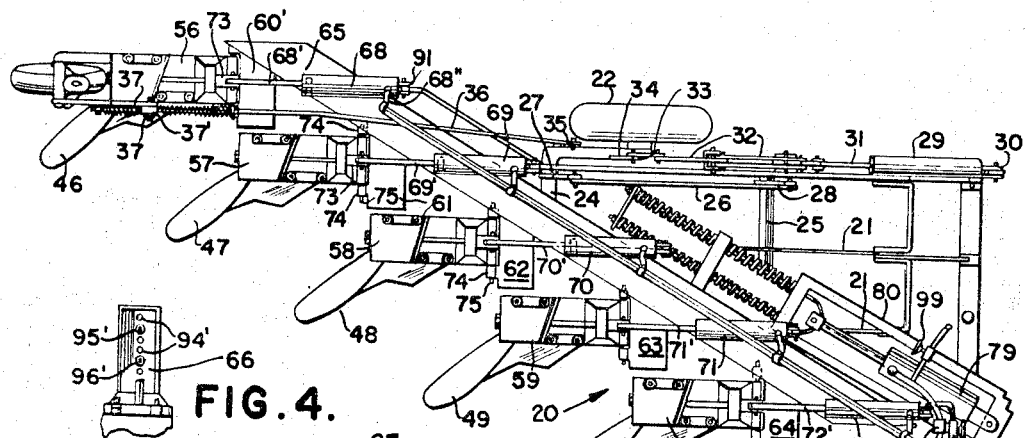
FIG. 4.
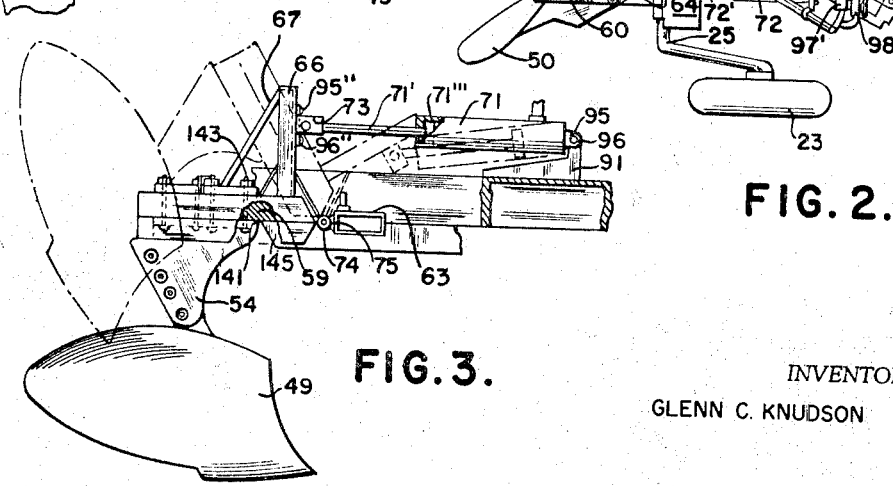
FIG. 2.
FIG. 3.
INVENTOR
GLENN C. KNUDSON

INVENTOR
GLENN C. KNUDSON

Oct. 31, 1967   G. C. KNUDSON   3,349,855
HYDRAULIC PLOW BOTTOM TRIP DEVICE
Filed May 18, 1965   3 Sheets-Sheet 3
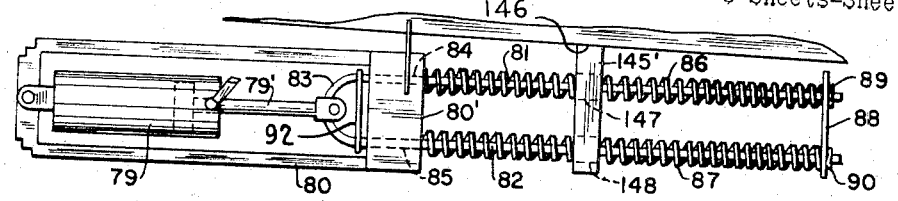
FIG. 9.
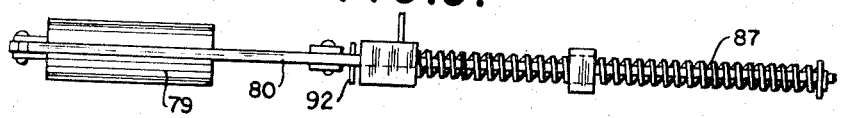
FIG. 10.
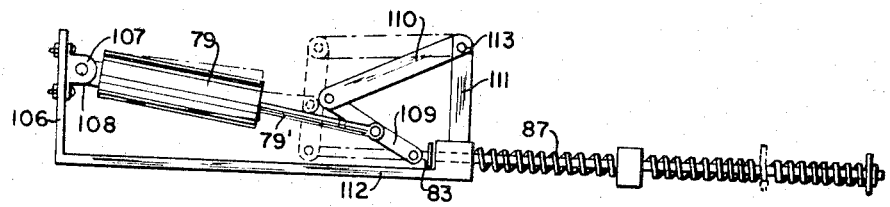
FIG. 11.
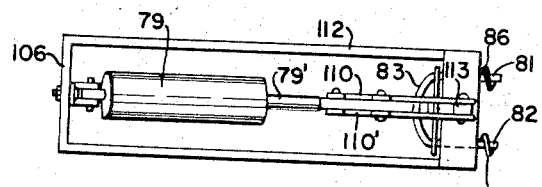
FIG. 12.
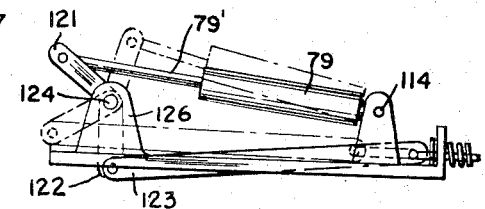
FIG. 13.
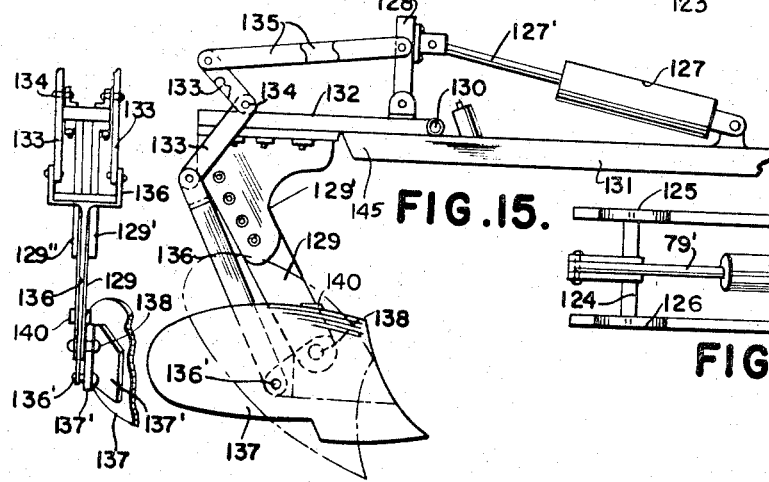
FIG. 15.
FIG. 16.
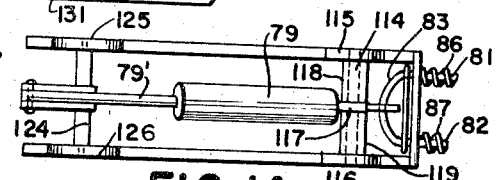
FIG. 14.
INVENTOR
GLENN C. KNUDSON

United States Patent Office 3,349,855
Patented Oct. 31, 1967

3,349,855
HYDRAULIC PLOW BOTTOM TRIP DEVICE
Glenn C. Knudson, R.R. 1, Box 37,
Larimore, N. Dak. 58251
Filed May 18, 1965, Ser. No. 456,631
6 Claims. (Cl. 172—261)

This application is a continuation-in-part of applicant's copending application Ser. No. 292,710, filed July 3, 1963 (now abandoned), for a hydraulic plow bottom trip device.

This invention relates to earthworking equipment and more particularly to plows such as moldboard plows and the like.

Plows have been provided which have included safety trip releases for the plow bottoms, so that if a boulder or like obstacle is encountered, which the plow cannot readily plow out of the way, the plow bottom will trip or release so that the bottom can by-pass the boulder. However, these prior devices have not proved to be entirely satisfactory; for example, most prior devices after releasing had to be reset by backing the tractor before the plowing could continue, and many of these prior devices were complicated and expensive to produce or manufacture.

It is an object of this invention to overcome these deficiencies and to provide a new automatic trip release for plow bottoms of a plow.

It is a further object of this invention to provide an automatic trip release for plow bottoms, with each bottom being capable of operating independently and including means for automatically returning the bottom to plowing position after the obstacle has been cleared.

It is a further object of this invention to provide a novel hydraulic return for the plow bottoms, whereby each plow bottom is provided with an individual trip cylinder and the trip cylinders are controlled by a single master cylinder and which automatically returns the plow bottoms to their working positions.

A further object is to provide a reset system in which the plow bottom may be returned to normal position at a retarded rate so as to avoid undue shocks in the implement.

Further objects and advantages of the invention will become apparent as the description proceeds in conjunction with the accompanying drawings wherein:

FIG. 1 is a side elevational view of the hydraulically activated moldboard plow;

FIG. 2 is a top plan view of the plow;

FIG. 3 is an enlarged sectional side view illustrating the trip cylinder for one of the pivotally mounted plow bottoms and illustrating in dotted lines the position of the plow bottom when fully tripped;

FIG. 4 is a rear fragmentary view of one of the plow bottoms;

FIG. 9 is a top plan view of the master cylinder and its compression spring, reversed as to fore-and-aft orientation;

FIG. 10 is a side elevational view of the master cylinder and the compression springs;

FIG. 11 is a side elevational view of one modified form of master cylinder and compression spring;

FIG. 12 is a top fragmentary view of the modified form of master cylinder;

FIG. 13 is a side elevational view of another modified form of master cylinder and compression spring;

FIG. 14 is a top plan view of the modified form of master cylinder of FIG. 13;

FIG. 15 is a modified form of plow bottom trip; and

FIG. 16 is a fragmentary end view of the modified bottom trip.

Figure 5:
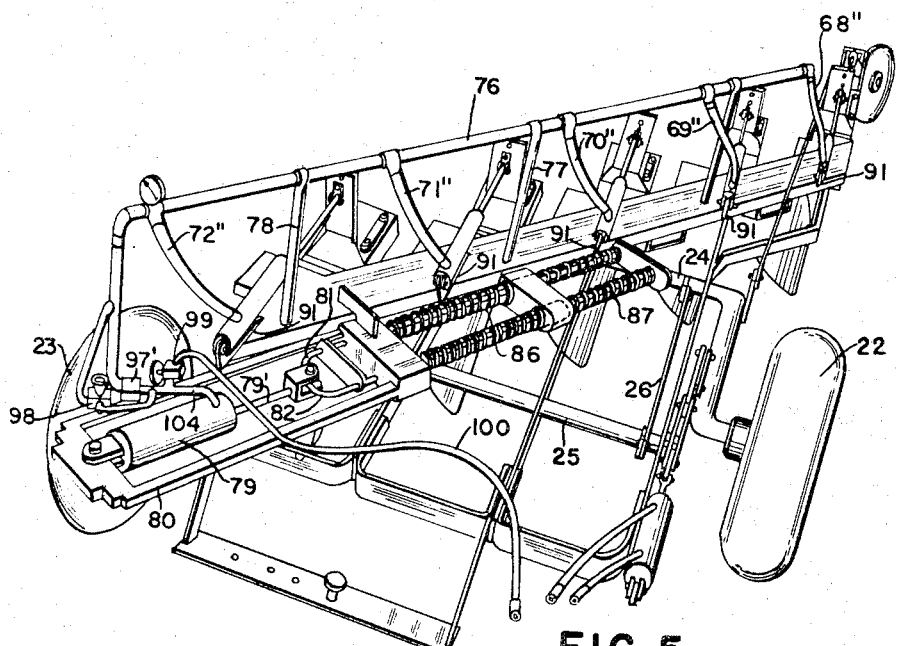
FIG. 5 is a front perspective view of the plow.
Figure 8:
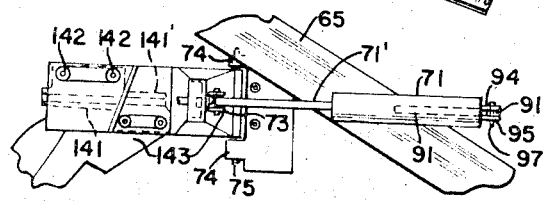
FIG. 8 is a top fragmentary view of the plow.
Figure 7:
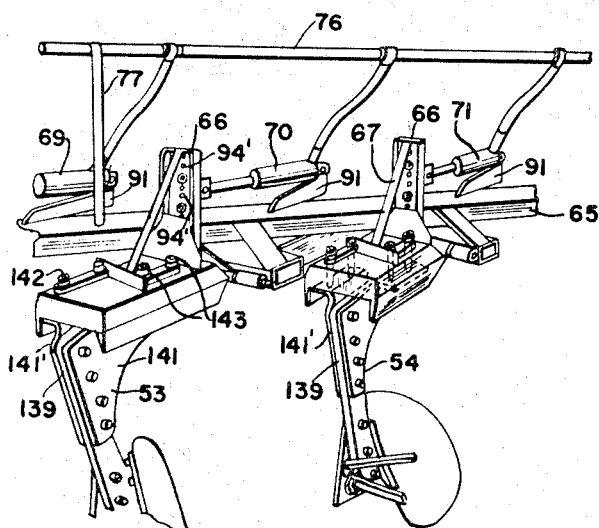
FIG. 7 is a rear fragmentary perspective view of the plow.

Briefly stated, the invention comprises a plow frame having a plurality of plow bottoms pivotally mounted along the rearward portion of the plow frame, each plow bottom having a hydraulic device or trip cylinder acting to hold it in set position for plowing relative to the frame, said trip cylinders being hydraulically connected to fluid-charging means such as a master cylinder so that, when the plow bottom encounters an obstacle creating a force greater than the pressure of the trip cylinder, fluid will be forced into the master cylinder, which is biased by compression springs so that the fluid forced into the master cylinder further compresses the springs; when the obstacle has been passed the pressure created in the master cylinder by the springs will cause the trip cylinder to return the plow bottom to its normal plowing position.

In FIG. 1, the plow, generally identified by the numeral 20, has a conventional plow frame 21 having a pair of side wheels 22 and 23 pivotally mounted to the forward portion of the plow in a conventional manner by means of their respective parallel shafts 24 and 25 which are connected together by means of a linkage bar 26 pivotally connected at its remote ends to an upright link 27 fixed to shaft 24 and an upright link 28 fixed to shaft 25 whereby raising and lowering of one wheel simultaneously raises and lowers the other wheel as is well-known in the art. A hydraulic device or cylinder 29 is mounted at its forward end 30 to the frame and has its piston rod 31 pivotally connected to linkage 32 which is in turn pivotally connected through a link bar 33 to the arm 34 of the side wheel 22 so that operation of the hydraulic cylinder 29 raises and lowers the wheel 22 and simultaneously raises and lowers wheel 23 relative to the plow frame.

An upright flange 35 is fixed to the shaft 24 of the wheel 22 so as to pivot with the shaft when the wheel is raised and lowered. The flange 35 is pivotally connected to a rod 36 which at its other end is connected to a pivoted plate 37 at the rear of the plow. The pivoted plate 37 is mounted to pivot about its pivot 38 between plate 39 and the frame, plate 39 being fixed to the frame.

The plate 37 in pivoting forward or clockwise as viewed from FIG. 1 raises the linkage 40 which in turn causes the plate 41 to pivot counterclockwise about its axis 42, lowering the shaft 43 relative to the frame, and, since shaft 43 is pivotally mounted to plate 41 and plate 44, the relative lowering of the shaft 43 also lowers the rear end of plate 44, causing it to pivot counterclockwise about its fixed axis 44'. The lowering of the shaft 43 causes the tail wheel 45, which is rotatably mounted to the lower end of the shaft 43, to move downwardly relative to the standard or frame, which will cause the frame to be raised.

The plow has a plurality of plow bottoms 46, 47, 48, 49 and 50, and these respectively have standards or shank parts 51, 52, 53, 54 and 55. Across the tops of the standards or shanks and fixed respectively thereto are five rectangular housing members 56, 57, 58, 59 and 60. Each of the housing members is pivotally mounted on one of five rectangular, relatively short, hollow mounting beams 60', 61, 62, 63 and 64, fixed to the frame 21. Mounted diagonally across the five beams is a beam 65 which is also fixed to the frame. Each of the housing members 56 through 60 has an upright flange 66 and each flange has a bracing rod 67 to the housing member.

Mounted in front of the upright flanges 66 of the housing members are five hydraulic trip cylinders 68, 69, 70, 71 and 72 and projecting at the rear ends of the trip cylinders are the respective piston rods 68', 69', 70', 71' and 72′, which are pivotally connected to the upright flanges 66 by brackets 73.

The housing members 56 through 60 are pivotally connected to the short beams 60′–64 of the frame by means of sleeves 74 fixed to the beams on opposite sides of each of the housing members. Each housing member has a pivot rod 75 fixed to its forward end and received respectively in said sleeves at their outer ends.

Mounted parallel to the diagonal beam 65 and extending along the length of the beam is a pipe or conduit 76 which is supported on the beam by means of a pair of braces 77 and 78. Five hose connections 68″, 69″, 70″, 71″ and 72″ are connected to the pipe 76 at intervals o provide fluid connections between the pipe and the trip cylinders.

Mounted directly ahead of the diagonal beam 65 and generally parallel thereto is an accumulator in the form of a master cylinder 79, which is supported in a frame 80 welded to the diagonal beam.

The accumulator or master cylinder is a fluid-charging means mounted at its forward end to the frame 80 and having its piston rod 79′ pivotally connected at its rear end to a pair of elongated rods 81 and 82 joined together by a U-shaped portion 83.

The frame 80 has a pair of bores 84 and 85 to slidably receive the rods 81 and 82 and provide a guide for the same, and a pair of compression springs 86 and 87 is telescoped over the rods. At the outer ends of the rods is a plate 88 having spaced bores to receive the outer ends of the rods and to retain the compression springs. A pair of nuts 89 and 90 is threaded onto the outer ends of the rods to secure the plate 88 thereon. A plate 92 having a pair of bores to receive the rods at their ends adjacent to the U-shaped portion 83 is provided to maintain the rods spaced the proper distance from one another.

Adjacent to the trip cylinders are upright horizontally elongated wing plates 91 welded to the diagonal beam 65, and the trip cylinders are pivotally mounted to the plates 91 by means of spaced projecting lugs 94 and 95 having bores aligned with wing plate bores 96 to receive a rod 97 to provide a pivotal mounting.

The upright flange 66 of each pivotal plow bottom has a plurality of uniformly vertically spaced hales 94′ to adjustably position a bracket 73. The bracket 73 has a pair of bolts 95″ and 96″ passing through a pair of holes in the bracket and a pair of the holes 94′ in the flanges, and the bolts are secured by threaded nuts 95′ and 96′. Mounted along the line 76 are further components of the hydraulic system of the invention, including a one-way valve 97′ and a restrictor valve 98. A cut-off valve 99 controls the flow of the fluid into the hydraulic system.

Operation

Figure 6:
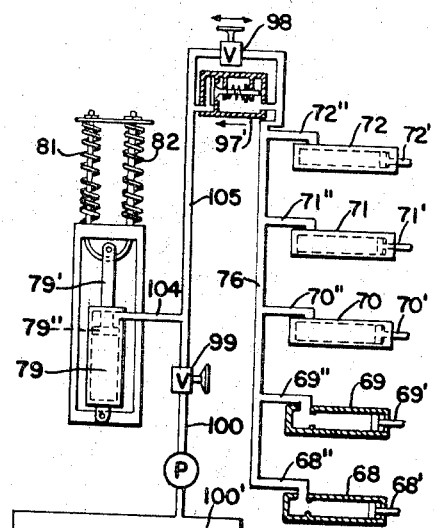
FIG. 6 is a schematic diagram of the hydraulic circuit for the plow.

The plow is conventionally attached to a tractor and the hydraulic system is pressure charged by connecting a charging hose 100 to the tractor's hydraulic system which includes a pump P and a reservoir 100′. The cut-off valve 99 is opened to allow the pump to force oil into the fluid line 100, past the cut-off valve 99, and into the master cylinder 79 along line 104, forcing rod 79′ away from the compression springs 86, 87 and drawing rods 81, 82 and plate 88 with it to compress the springs against face 80′. Oil is also pumped along line 100 through a line 105 and through restrictor valve 98 into the trip cylinders 68–72 along the line 76. When the compression springs have been compressed approximatelly ¾ of an inch, the cut-off valve 99 is closed and the hydraulic system is now charged for operation, since the fluid pressure against the trip cylinder pistons, created in the system by the comprission springs 86, 87, will maintain each trip rod 68′–72′ projected rearwardly, as illustrated in FIGS. 1, 2 and 6, under sufficient pressure to maitain the bottoms in their normal plowing positions so as not to yield or trip rearwardly unless boulders or other obstacles are encountered of such resistance that the plow bottoms are normally incapable of moving or setting them aside.

As the plow is drawn along through the field during plowing, if any one of the plow bottoms 46 through 50 encounters or strikes an obstacle or boulder, creating a force greater than the pressure maintained in the trip cylinders, this will cause the plow bottom which encountered the obstacle to pivot or trip backward. Assuming for purposes of illustration that the plow bottom 49, illustrated in FIG. 3, has engaged a boulder, the plow bottom will pivot backwards or clockwise from its normal plowing position illustrated in solid lines to its maximum tripped position illustrated in phantom lines, by pivoting about its pivotal mounting 75 so as to allow the plow bottom to clear the obstacle. The pivoting backwards of the plow bottom forces the piston rod 71′ and its piston 71‴ forwardly in the trip cylinder 71, thereby forcing oil out of the trip cylinder and through the one-way valve 97′ and into the master cylinder 79, forcing the piston rod 79′ and its piston 79″ farther away from the springs 86 and 87 and thereby further compressing the springs.

When the obstacle has been cleared, master cylinder pressure will automatically return the trip cylinder and rod to its normal position, thereby returning the plow bottom 49 into the ground and to its normal position as the springs extend to normal, while the plow and tractor continue to move on through the field.

The one-way valve 97′ allows an unrestricted flow of oil from the trip cylinders into the master cylinder 79, when any one of the trip cylinders has been tripped. In the return flow, however, back to trip cylinders, the oil must pass through the restrictor valve 98, which can be adjusted to any desired diameter so that the return speed of the plow bottom back to its normal position can be adjusted.

Any one of the plow bottoms may be tripped when an obstacle is engaged which creates a pressure greater than the compression springs after being charged. The master cylinder 79 will have a sufficient volume to handle at least two fully tripped bottoms at once.

The cylinder ports and hoses must be of a sufficient size as not to unduly restrict the oil flow, and it has been found that a 3-inch diameter master cylinder works satisfactorily with a compression spring of a six thousand pound resistance which would create a pressure of approximately a thousand pounds per square inch and that with only a 2-inch diameter trip cylinder this pressure will create a force of approximately 3141 pounds per square inch; although, varying sizes of trip cylinders and master cylinders may be used.

Smaller size cylinders and higher pressures will eliminate the need for excessively large hydraulic hoses and fittings. Also other forms of stored hydraulic potential may be used to actuate the system. Thus it may be desirable for example to use a relief valve in the hydraulic supply line for returning the over pressured oil to the system's reservoir. Also the size of the compression springs and the amount of hydraulic pressure may be varied, depending upon at what degree of pressure it is desired that the plow bottoms be tripped.

Since the plow bottoms only need to pivot back a sufficient distance to clear the obstacle and then will return immediately and automatically to their normal position, unless the obstacle is unusually large, just a fraction of its capability is used to clear, which in many cases will hardly interrupt the furrow pattern. It has been found that the trip cylinders for example may have a two-inch bore with a 10-inch stroke, and the master cylinder may have a 3.375-inch bore with an 8-inch stroke and that 750 lbs.–800 lbs. pressure per square inch seems to be sufficient for normal plowing.

The entire operation is automatic once the hydraulic system has been charged, since each hydraulic trip cylinder will have sufficient pressure to automatically return or pivot its plow bottom back down into the ground, or in other words, its normal plowing position without stopping to reset the plow bottom each time after it has been tripped, since once the plow bottom has cleared the obstacle there is sufficient pressure to return the bottom during plowing and while the tractor and plow continue to move on through the field.

The plow bottom 46 pivots about its axis 75 and carries the tail wheel 45 and the mounting structure with it. The plate 37 has a sleeve 37' which is slidably mounted over the rod 36, and since the tripping movement will be clockwise and the sleeve 37' is pivotally mounted to the plate 37, the sleeve will merely slide forwardly toward the tractor, along the rod 36, slightly compressing the spring 37" along the forward portion of the rod 36. When the plow bottom has cleared the obstacle the plow bottom and tail wheel structure 45 will swing back down to their normal positions. Thus the tripping of the plow bottom 46 will also not interfere with the raising and lowering of the tail wheel 45.

The standards 51 through 55 comprise a conventional central plate 139, the lower end of which is fixed to the plow bottom in a conventional manner and with a pair of side flanges 141 and 141' each of which has out-turned upper flange portions bolted to the roof of the housing members by means of bolts 142 and 143.

The frame 21 has the rearward ends 145 of its beams providing a support for the housing members 56 through 60 to rest on and to limit the downward movement of the plow bottoms and housing members.

The bracket 145' (FIG. 9) is welded to the diagonal beam 65 along its one end 146, and is provided with a pair of bores 147 and 148 which are oversized with respect to the compression springs 86 and 87 so that the springs may slide freely in the bores and yet be supported by the bracket 145.

Modified form of hydraulic means and compression spring structure

A modified form of accumulator structure is illustrated in FIGS. 11 and 12 which enables the hydraulic pressure to be more nearly constant as the plow bottoms are tripped and the springs are compressed. The master cylinder 79 is mounted on an upright flange 106 by means of a bracket 107 and rod 108 and is pivotally connected to a linkage 109 at the forward end, and this linkage in turn is pivotally connected at its one end to the U-shaped connecting portion 83 of the spring rods 81 and 82 and is pivotally connected to linkage 110 at its other end. The linkage 110 in turn is pivoted at 113 to an upright flange 111 at the rear end of the frame 112.

When hydraulic pressure is introduced through line 100 and through the cut-off valve 99 to charge the system, the hydraulic fluid will force the piston rod 79' toward the upright flange 106, drawing the spring rods 86 and 87 forwardly, from their position shown in solid lines in FIG. 11 to their position shown in phantom lines. Since the length of stroke for the hydraulic cylinder by virtue of its linkage connection is shorter than the length of stroke of the compression springs, the hydraulic pressure system when the bottoms are tripped is more nearly constant throughout the compression of the springs.

Second modified form of hydraulic means and compression spring structure

This structure is illustrated in FIGS. 13 and 14, wherein the master cylinder 79 is pivotally mounted by rod 114 between side flanges 115 and 116, the cylinder having a bored lug 117 for receiving the rod. Collars 118 and 119 on the rod on each side of the lug maintain the cylinder in a central location.

The cylinder 79 has its piston rod 79' connected pivotally at its forward end to a bell crank having one leg 121 pivoted to the piston rod 79' and its other leg 122 pivotally connected to the linkage 123. The linkage 123 is disposed between the side flanges 115 and 116 and is pivotally connected to the U-shaped rod portion 83 of the spring rods 81 and 82. The bell crank is rockable on a rod 124 between raised side portions 125 and 126 of flanges 115, 116, respectively.

When the master cylinder is charged and one of the trip cylinders is tripped by the plow bottom, forcing the piston rod rearwardly, the bell crank linkage will rock about the rod 124 from its position shown in solid lines in FIG. 13 to its position shown in phantom lines.

Modified plow bottom hydraulic trip

A modified form of hydraulic plow bottom trip is illustrated in FIG. 15. The hydraulic device or trip cylinder, designated by the numeral 127, has its piston rod 127' mounted to an upright arm or link 128. The interconnecting structure or standard, which has a conventional central plate 129 and a pair of side plates 129', 129", is pivotally mounted at pivot point 130 to frame 131 in the same manner as in the form of plow bottom illustrated in FIGS. 1 through 7. The link 128 is pivoted to the top plate 132 of the standard, and a pair of bell cranks 133 are rockable on each side of the plate 132 about pivots 134. The bell cranks have their upper ends pivotally connected to linkage 135 which in turn is pivotally connected to the links 128. The bell cranks have their lower legs pivotally connected to a link 136 and the plow bottom 137 has a lever part such as a plate or frog 137' fixed thereto and pivoted to the standard 129 at 138; and the link 136 is pivotally connected to the plate 137' of the plow bottom at 136'.

When an obstacle impedes the plow bottom which might otherwise hook the bottom, the bottom may pivot in a clockwise direction about its axis 138 from its position shown in solid lines in FIG. 15 to its position shown in dash lines, the linkage 136, 133 and 135 pivoting the link 128 clockwise and forcing the piston rod 127' forwardly to thereby prevent the plow bottom from hooking under the obstacle. In order to clear the obstacle, since the plow normally will continue to move forward, the standard 129, including the top plate 132, will also pivot around its axis 130, along with the linkage, until the bottom can clear. After clearing, the trip cylinder 127 will force the link 128 rearwardly, pivoting the bottom back to its normal position.

To limit the counterclockwise rotational movement of the plow bottom 137 to its normal plowing position upon resetting, a U-shaped stop 140 is welded to the upper edge of frog 137' and has its bight portion normally disposed along the forward edge of the standard 129, the leg portions thereof extending rearwardly from the bight and disposed about the sides of the standard. Thus, after an obstruction has been cleared, the standard 129 and bottom 137 will be rotated forwardly as the cylinder 127 extends, the bight of the stop 140 engaging the forward edge of the standard 129 to limit forward rotation of the bottom 127, the forward edge forming abutment means. It should be noted that the trip cylinder 127 is never allowed to become fully extended, and that when the bottoms are in their normal plowing position, the force of the cylinder is exerted against the plate 132, the upper pivot stop or abutment 145, and the plow bottom stop 140 to maintain the standard 129 and the plow bottom 137 in proper position in respect to the frame. It should also be noted that the stop 140 prevents the bottom from rotating in a counterclockwise or forward direction when the standard is being moved rearwardly about pivot 130. If the stop 140 were not present, it would be possible for the standard to move rearwardly about pivot 130 without compressing cylinder 127, since the linkage 135, 133, 136 could cause the bottom to tilt forwardly. Thus the stop ensures that the cylinder will be compressed when the bottom moves rearwardly about pivot 130.

It will be obvious that various changes and departures in addition to those described may be made without departing from the spirit and scope of the invention and accordingly it is not intended that the invention be limited to that specifically illustrated in the drawings or described

What is claimed is:

1. In a moldboard plow adapted to move forwardly over the ground and including a frame, a plow bottom assembly, and interconnecting structure pivotally secured to said plow bottom assembly and extending upwardly and forwardly to a point of pivotal connection with said frame whereby said plow bottom may swing upwardly and rearwardly from a normal ground-working position to a raised tripped position, the combination therewith of first abutment means on said frame and engageable with said interconnecting structure to limit rotational movement of said interconnecting structure relative to said frame in one direction, second abutment means on said interconnecting structure and engageable with said plow bottom assembly to limit rotational movement of said plow bottom assembly relative to said interconnecting structure in one direction, a fluid device having one end secured to said frame, means linking the other end of said fluid device with said plow bottom assembly and cooperable with said fluid device to normally hold said plow bottom asesmbly in a normal ground-working position with the plow bottom assembly and said interconnecting structure engaging said second and first abutments, respectively, but permitting upward and rearward movement of said plow bottom assembly opposed by said fluid device, said fluid device and said linking means being disposed above and behind the interconnecting structure, means operable to resist displacement of fluid from said device in normal conditions but permitting fluid to be displaced when an object is encountered by the plow bottom assembly which cannot readily be plowed out of the way, and means to return the plow bottom assembly to its normal position at a regulated rate after the object has been passed.

2. In a moldboard plow adapted to move forwardly over the ground, the combination comprising a frame, a plow bottom assembly, linkage means connecting said plow bottom assembly to said frame, said linkage means including a lower link, lower pivot means to the rear of the forward point of the plow bottom assembly and interconnecting a portion of said plow bottom assembly with said lower link in such a manner that said bottom assembly may move about said lower pivot from a normal working position to a fully tripped position with the point of the plow bottom being disposed below the normal furrow bottom, upper pivot means above the forward point of the plow bottom and pivotally connecting a forward portion of the lower link with the frame in such a manner that a plow bottom assembly may swing upwardly from a normal working position to a raised position with the point of the plow bottom being disposed above the normal furrow bottom whereby an obstacle may be cleared, first and second abutment means on the frame and said lower link respectively, and cooperable with said lower link and said plow bottom assembly, respectively, to limit rotation in one direction, upper link means pivotaly secured to said plow bottom assembly and including a hydraulic device connected to said frame, said upper means acting to normally bias said bottom assembly against said second abutment.

3. In a moldboard plow adapted to move forwardly over the ground and including a frame, a plow bottom assembly, and interconnecting structure pivotally secured to said plow bottom assembly and extending upwardly and forwardly to a point of pivotal connection with said frame whereby said plow bottom may swing upwardly and rearwardly from a normal ground-working position to a raised tripped position, the combination therewith of first abutment means on said frame and engageable with said interconnecting structure to limit rotational movement of said interconnecting structure relative to said frame in one direction, second abutment means on said interconnecting structure and engageable with said bottom assembly to limit rotational movement of said plow bottom assembly relative to said interconnecting structure in one direction, yieldable force-applying structure having one end secured to said frame, and means linking the other end of said force-applying structure with said plow assembly and cooperable with said force-applying structure to normally hold said plow bottom assembly in a normal ground-working position with the plow bottom assembly and said interconnecting structure engaging said second and first abutments, respectively, but permitting upward and rearward movement of said plow bottom assembly opposed by said force-applying structure, said force-applying structure and said linking means being disposed above and behind the interconnecting structure, said linking means cooperating with lever arm means on the plow bottom assembly extending rearwardly of the pivotal interconnection between said interconnecting structure and said assembly, the rearward end of said lever arm means being provided with pivot means interconnectable with said force-applying means.

4. The plow set forth in claim 3 in which said force-applying structure includes a hydraulic cylinder movable between extended and retracted positions and normally biased in one of its positions by fluid under pressure, said linking means moving said cylinder to the other of its positions against fluid pressure during relative rearward and upward movement of said assembly.

5. In a moldboard plow adapted to move forwardly over the ground and including a frame, a plow bottom assembly, and interconnecting structure pivotally secured to said plow bottom assembly and extending upwardly and forwardly to a point of pivotal connection with said frame whereby said plow bottom may swing upwardly and rearwardly from a normal ground-working position to a raised tripped position, the combination therewith of first abutment means on said frame and engageable with said interconnecting structure to limit rotational movement of said interconnecting structure relative to said frame in one direction, second abutment means on said interconnecting structure and engageable with said bottom assembly to limit rotational movement of said plow bottom assembly relative to said interconnecting structure in one direction, yieldable force-applying structure having one end secured to said frame, and means linking the other end of said force-applying structure with said plow bottom assembly and cooperable with said force-applying structure to normally hold said plow bottom assembly in a normal ground-working position with the plow bottom assembly and said interconnecting structure engaging said second and first abutments, respectively, but permitting upward and rearward movement of said plow bottom assembly opposed by said force-applying structure, said force-applying structure and said linking means being disposed above and behind the interconnecting structure, and said linking means cooperating with first lever arm means on the plow bottom assembly extending rearwardly of the pivotal interconnection between said interconnecting structure and said assembly, a first link pivotally connected with said lever arm means at one end, a bell crank pivotally mounted on said interconnecting structure, the other end of said first link being pivotally connected to the first leg of said bell crank, the second leg of said bell crank being pivotally interconnected with one end of a second link, second lever arm means pivotally connected at one end with said interconnecting structure, the other end of the second link being pivotally interconnected with the other end of said second lever, and means interconnecting the other end of said second lever with said force-applying structure, said force-applying structure including a hydraulic motor.

6. In a plow, the combination of a frame adapted to be moved forwardly over the ground, a plow bottom assembly, interconnecting structure pivotally connected to the assembly and extending upwardly and forwardly to a point of pivotal connection with the frame for enabling the assembly to move rearwardly and upwardly relative to the frame from a normal plowing position to a tripped position and for forward and downward return to said normal position, means for limiting forward and downward movement of said assembly to said normal position, and mechanism cooperative among the frame, the interconnecting structure and the assembly for normally retaining said assembly in, and for returning said assembly to, its normal position and yieldable when said assembly encounters an obstruction of such magnitude as to incur said tripped position, said mechanism including a fluid-charging means and a fluid device connected thereto and normally chargeable therefrom to retain and regain said normal position of said assembly and at least partially dischargeable to permit attainment by said assembly of its tripped position when such obstruction is encountered, said mechanism having means for enabling discharging of said device at a relatively rapid rate and means limiting re-charging of said device to a relatively slower rate.

References Cited

UNITED STATES PATENTS

| | | | |
|---|---|---|---|
| 418,300 | 12/1889 | Wilson | 172—266 |
| 554,892 | 2/1896 | McFall | 172—265 |
| 1,219,342 | 3/1917 | Myers | 172—264 |
| 1,524,369 | 1/1925 | Ramage | 172—705 |
| 2,379,779 | 7/1945 | Ash | 172—657 X |
| 2,906,353 | 9/1959 | Rogers | 172—265 |
| 3,042,122 | 7/1962 | Anderson | 172—265 |
| 3,062,330 | 11/1962 | Lyon | 267—64 X |
| 3,172,481 | 3/1965 | Trollsas | 172—261 |

ABRAHAM G. STONE, *Primary Examiner.*

ANTONIO F. GUIDA, *Examiner.*

J. R. OAKS, *Assistant Examiner.*